(12) United States Patent
McCollough et al.

(10) Patent No.: US 6,604,735 B2
(45) Date of Patent: Aug. 12, 2003

(54) ELASTOMER VARIANTS

(75) Inventors: Trevor J. McCollough, Minneapolis, MN (US); Robert James Monson, St. Paul, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/997,188

(22) Filed: Nov. 29, 2001

(65) Prior Publication Data

US 2002/0079632 A1 Jun. 27, 2002

Related U.S. Application Data

(63) Continuation-in-part of application No. 09/745,368, filed on Dec. 22, 2000.

(51) Int. Cl.[7] .................................................. F16M 1/00
(52) U.S. Cl. ........................ 267/140; 293/120; 267/294; 267/140.3; 267/153
(58) Field of Search ............................ 114/219; 293/50, 293/102, 104, 120, 126, 135, 136; 267/195, 201, 292, 294, 136, 139, 140, 140.2, 140.3, 141.3, 153

(56) References Cited

U.S. PATENT DOCUMENTS

| | | | | |
|---|---|---|---|---|
| 3,418,815 A | * | 12/1968 | Kumazawa | 405/215 |
| 3,533,242 A | * | 10/1970 | Narabu | 405/215 |
| 3,779,536 A | * | 12/1973 | Lachmann | 267/140 |
| 3,788,082 A | * | 1/1974 | Narabu | 405/215 |
| 3,948,500 A | * | 4/1976 | Korbuly et al. | 267/140 |
| 4,059,254 A | * | 11/1977 | Fielding-Russell et al. | 267/140 |
| 4,269,400 A | * | 5/1981 | Jensen | 267/153 |
| 4,277,055 A | * | 7/1981 | Yamaguchi et al. | 267/140 |
| 4,319,539 A | * | 3/1982 | Fujii et al. | 114/219 |
| 4,545,316 A | * | 10/1985 | Yamaguchi et al. | 114/219 |
| 4,756,266 A | * | 7/1988 | Sakuraoka | 114/219 |
| 4,901,486 A | * | 2/1990 | Kobori et al. | 52/167.2 |
| 5,054,414 A | * | 10/1991 | Yamaguchi | 114/219 |
| 5,121,905 A | * | 6/1992 | Mann et al. | 267/141.4 |
| 5,149,069 A | * | 9/1992 | Hein | 267/153 |
| 5,351,940 A | * | 10/1994 | Yano et al. | 267/153 |
| 5,458,077 A | * | 10/1995 | Enami et al. | 114/219 |
| 5,613,667 A | * | 3/1997 | Ho | 267/141.1 |
| 5,975,000 A | * | 11/1999 | Nakamura | 114/219 |
| 5,988,609 A | * | 11/1999 | Young | 267/140 |
| 6,050,211 A | * | 4/2000 | Yamaguchi | 114/219 |
| 6,187,420 B1 | * | 2/2001 | Tajima et al. | 428/213 |
| 6,276,674 B1 | * | 8/2001 | Randell | 267/141.4 |

* cited by examiner

Primary Examiner—Christopher P. Schwartz
Assistant Examiner—Devon Kramer
(74) Attorney, Agent, or Firm—Patrick M. Hogan; Glenn W. Bowen

(57) ABSTRACT

A modular shock isolator and method of isolation of components of a system with multiple modular shock isolators arranged to provide different damping and vibration characteristics than an individual modular shock isolator. In one mode, a modular shock isolator having a base with legs extending from each side of the base with each of the legs having a foot that extends outward from the legs with the modular shock isolator either individually mounted to isolate a component or a plurality of modular shock isolators are be ganged, or stacked together to change the shock isolation characteristics of the shock mount formed from the multiple modular shock isolators. A layer of damping material can be sandwiched between layers of elastomers to dampen the natural spring-back of the materials.

17 Claims, 3 Drawing Sheets

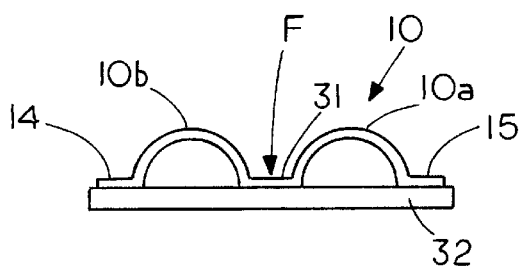
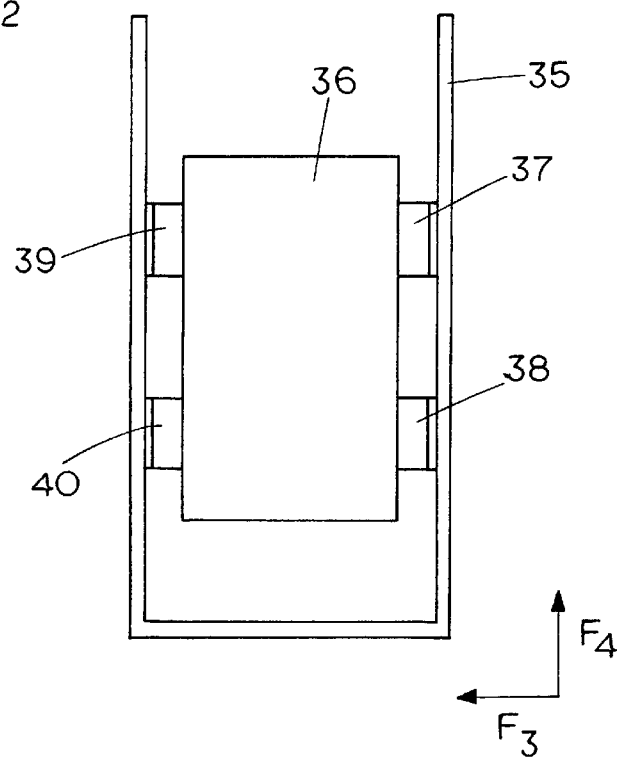
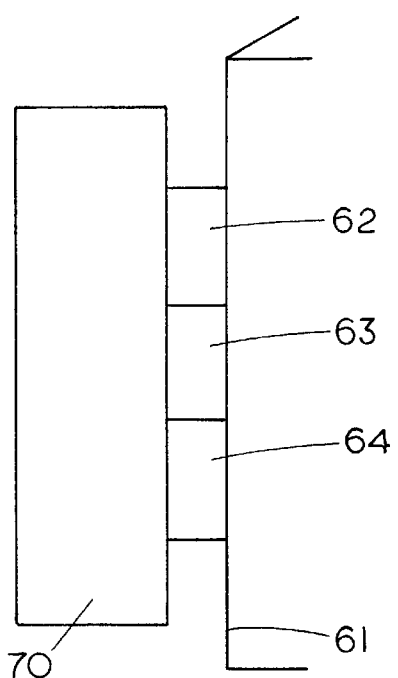
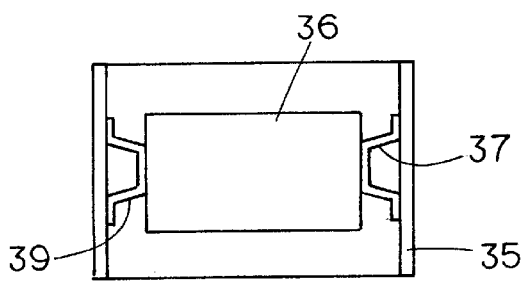

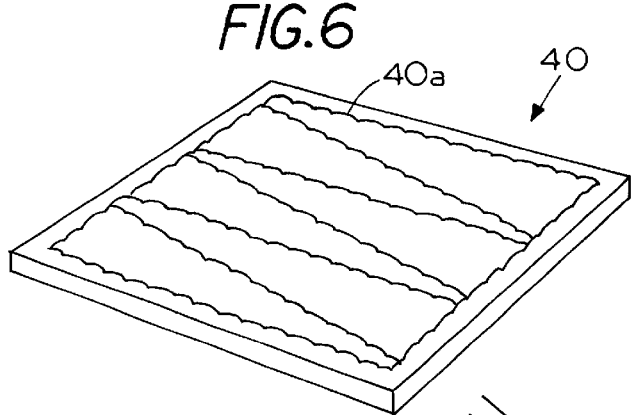
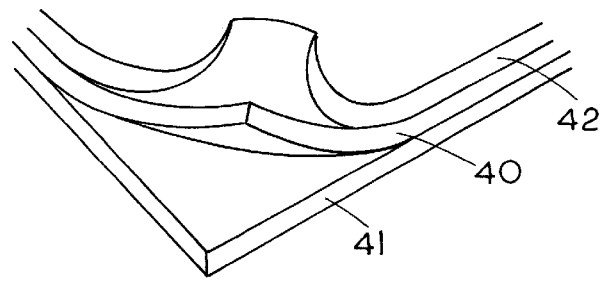
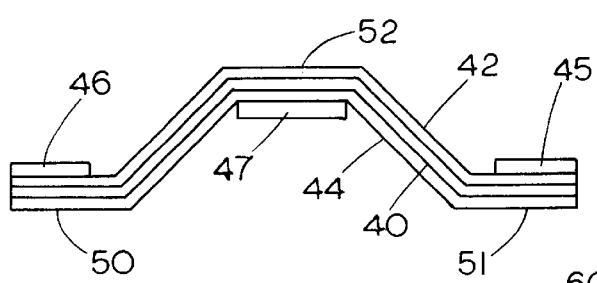
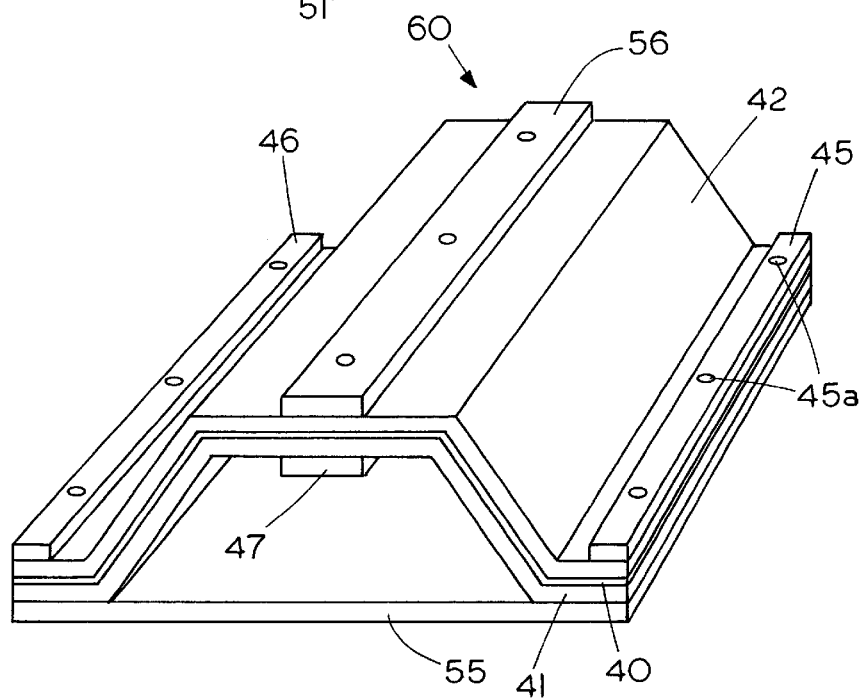

ELASTOMER VARIANTS

CROSS REFERENCE TO RELATED APPLICATIONS

This application is a continuation-in-part of copending application Ser. No. 09/745,368 filed Dec. 22, 2000 titled Shock Isolator.

FIELD OF THE INVENTION

This invention relates to shock isolators and, more specifically, to modular shock isolators and a method of shock isolation of components of a system with multiple modular shock isolators.

STATEMENT REGARDING FEDERALLY SPONSORED RESEARCH OR DEVELOPMENT

None

REFERENCE TO A MICROFICHE APPENDIX

None

BACKGROUND OF THE INVENTION

Various elastomeric materials have been used, or suggested for use, to provide shock and/or vibration damping as stated in U.S. Pat. No. 5,766,720, which issued on Jun. 16, 1998 to Yamagisht, et al. These materials include natural rubbers and synthetic resins such as polyvinyl chlorides, polyurethane, polyamides polystyrenes, copolymerized polyvinyl chlorides, and poloyolefine synthetic rubbers as well as synthetic materials such as urethane, EPDM, styrene-butadiene rubbers, nitrites, isoprene, chloroprenes, propylene, and silicones. The particular type of elastomeric material is not critical but urethane material sold under the trademark Sorbothane® is currently employed. Suitable material is also sold by Aero E.A.R. Specialty Composites, as Isoloss VL. The registrant of the mark Sorbothane® for urethane material is the Hamilton Kent Manufacturing Company (Registration No. 1,208,333), Kent, Ohio 44240.

The elastomeric elements employed in the prior art were commonly formed into typical geometric 3D shapes, such as spheres, squares, right circular cylinders, cones, rectangles and the like as illustrated in U.S. Pat. No. 5,776,720. These typical geometric shapes, do not minimize or eliminate shock and vibration to the degree accomplished by the elastomeric shock isolators of the present invention.

One of the difficulties of providing shock isolation to components of a system is that because of the different types and sizes of equipment in a system one requires shock isolators or shock mounts of different size, of different damping characteristics as well as different load bearing characteristics. In order to properly isolate all the equipment in the system each of the shock isolators are designed and then manufactured so as to have the proper shock and damping characteristics to protect an individual system component. Thus, isolating a single system from shock and vibration can require multiple different shock isolators or shock mounts. In contrast, the present invention comprises a method of shock isolation of the various components of a system using multiple identical modular shock isolators.

In order to obtain the proper shock and damping characteristics for the shock mounts of each of the components of the system more or less of the modular shock isolators are ganged or tiled together to provide a shock mount with the proper shock and vibration characteristics. That is, instead of manufacturing an individual shock isolator for each component of the system one can manufacture a modular shock isolator and then through a process of in situ assembly of multiple modular shock isolators one can create a shock mount of desired shock and vibration characteristics.

The present method allows for mass production of a high damp elastomer modular shock isolator while at the same time allowing one to use the modular shock isolators to create shock mounts for different components since the number of modular shock isolators used can be selected to obtain the proper damping characteristics. For example, in one application two modular shock isolators can be stacked on one another to obtain the proper damping characteristics and in another application three modular shock isolators can be arranged in side by side or end-to-end relationship to obtain the necessary damping characteristics. Thus, instead of requiring multiple shock isolators a user can consult a precalculated chart showing the damping and shock isolation characteristics of various ganged modular shock isolators to select the modular arrangement to incorporate into the system to provide the proper shock mounts for each of the components of the system.

Another of the difficulties of utilizing damping materials is that the fluidic nature of damping materials make it difficult to use the damping materials in applications that require structural integrity. In the present invention the fluidic type damping materials are incorporated between layers of elastomers in the modular isolator with the damping material selectively secured to the elastomer materials of the modular isolator to thereby provide a modular shock isolator with the necessary damping characteristics and the necessary shock and isolation characteristics.

DESCRIPTION OF THE PRIOR ART

U.S. Pat. No. 4,059,254 shows are energy absorbing unit comprising an elastomeric member arranged in a trapezoidal configuration. A sliding piston is incorporated in the unit which has limited displacement due to a pin that slides within an elongated slot.

SUMMARY OF THE INVENTION

Briefly, the invention comprises a modular shock isolator and method of isolation of components of a system with multiple modular shock isolators. In one mode, a modular shock isolator having a base with legs extending from each side of the base with each of the legs having a foot that extends outward from the legs can be individually mounted to support plates or a plurality of modular shock isolators can be ganged, or stacked together to change the shock isolation characteristics of the shock mount formed from the multiple modular shock isolators. A layer of damping material can be sandwiched between layers of elastomers to dampen the natural spring-back of the materials.

BRIEF DESCRIPTION OF THE DRAWINGS

FIG. 4 is an end view of the elastomeric shock isolator of FIG. 2 wherein the elastomeric shock isolator has been compressed to illustrate that the elastomeric shock isolator can provide a cushion effect when compressed;

FIG. 5 is a front view of a cabinet with a set of shock isolators holding the inner compartment in a shock isolated condition;

FIG. 5A is a top view of the cabinet with shock isolators shown in FIG. 5.

FIG. 5B is a side view of a second cabinet using three modular shock isolators arranged in an end-to-end relationship;

FIG. 6 is a perspective view of a layer of damping material for sandwiched between layers of elastomer material;

FIG. 7 is a perspective view of a portion of a modular shock isolator revealing the multiple layers of material comprising the shock isolator;

FIG. 8 is an end view of a modular shock isolator having multiple layers; and

FIG. 9 is a perspective view of a modular shock isolator for installation in a system.

DESCRIPTION OF THE PREFERRED EMBODIMENT

Figure 1:
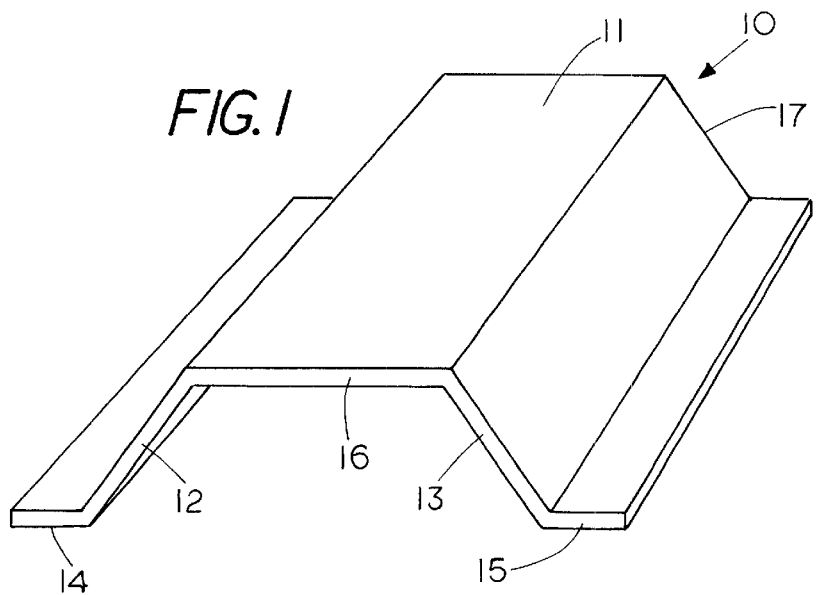
FIG. 1 is a perspective view of a molded elastomeric shock isolator for incorporating in a modular shock mount.

FIG. 1 is a perspective view of a molded modular elastomeric shock isolator 10 for incorporating in a shock mount. Modular shock isolator 10 comprises an elastomeric member that includes a base 11 having a first integral leg 12 extending angularly at a first angle from one edge of base 11 and a second integral leg 13 extending angularly from the opposite edge of base 11. A first integral foot 14 extends laterally outward from the lower end of leg 12 and similarly a second integral foot 15 extends laterally outward from the lower end of leg 15 to form an open cell. In the embodiment shown the base 11 and feet 14 and 15 are located in a parallel spaced apart condition to permit mounting of support plates thereon to thereby enable the shock isolator 10 to be incorporated into a shock mount to enable the elastomeric member to isolate shock from one support plate to the opposite support plate.

Figure 2:
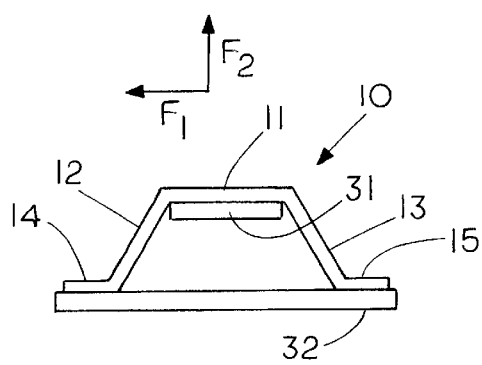
FIG. 2 is an end view of an elastomeric shock isolator supported by rigid mounting plates to provide a shock mount with shear and tension support.

In the embodiment shown in FIG. 2 a first support plate 31 can be secured to base 11 and a second support plate can be secured to feet 14 and 15 to provide parallel support plates for positioning the shock isolator in a shock isolation condition. Positioning of support plates on base 11 and feet 14 and 15 provides an elastomeric shock isolator with tension resistance.

FIG. 1 shows elongated elastomeric shock isolator 10 has a front end face 16 and a rear end face 17 located on the rear thereof with front end face 16 and rear end face 17 located in a parallel condition to permit attachment of support plates thereto rather than to feet 14, 15 and base 11. By mounting support plates to front end face 16 and rear end face 17 instead of feet 14, 15 and base 11 the elastomeric shock isolator 10 can be positioned to provide both elongation and compression resistance to shock and vibration.

Figure 1A:
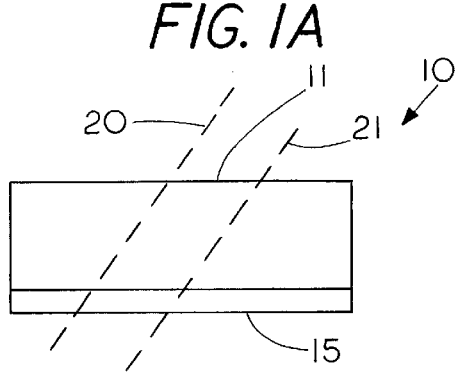
FIG. 1A is a side view of the molded elastomeric shock isolator of FIG. 1 with dashed lines indicating the angle cutting of the molded elastomeric shock isolator to produce an angular shock isolator.

A further feature of the elastomeric isolator 10 is the ability to change characteristics of the elastomer cell 10 without changing the composition of the elastomeric cell by utilizing a bias cut to form angled end faces rather than an orthogonal cut which produces right angle end faces. FIG. 1A illustrates the bias cut to produce angled end faces. FIG. 1A is a side view of the molded elastomeric shock isolator 10 with dashed lines 20 and 21 representing planes that extend at an angle through elastomeric shock isolator 10. If the elastomeric shock isolator 10 is cut along planes indicated by the dashed lines 20 and 21 it produces a bias cut with each of the cut faces at an angle other than a right angle to base 11 and foot 15. One can secure a rigid support plate to each of the cut faces to produce a shock mount with a bias cut. By cutting the elastomeric shock isolator 10 on a bias angle i.e. (an angle that is not normal to a major face) the damping and shock isolation characteristics of the elastomeric shock isolator 10 can be changed. Thus the designer not only has the option of changing materials to change the operational characteristics of the elastomeric shock isolator 10 but the dynamic characteristics of the elastomeric shock isolator 10 can also be changed by the faces selected for securing the elastomeric shock isolator 10 to the rigid support plates. This feature is, particularly useful where the type of elastomer materials may be limited by environmental factors but shock mounts of different operating ranges are required.

FIG. 2 shows a molded elastomer material 10 having a base 11 with a first leg 13 extending from a first side of the base 11 and a second leg 12 extending from the second side of the base 11, with each of the legs positioned at an angle of less than 180 degrees with respect to the base but more than 90 degrees with respect to base with the base securable to a first support surface or rigid plate 31 and feet 14 and 15 extending from the legs securable to a second support surface 32 so that a shock received by either the first support 31 is isolated from the second support 32 or a shock received by the second support 32 is isolated from first support 31 by the tension resistance of the elastomer material 10.

Figure 1B:
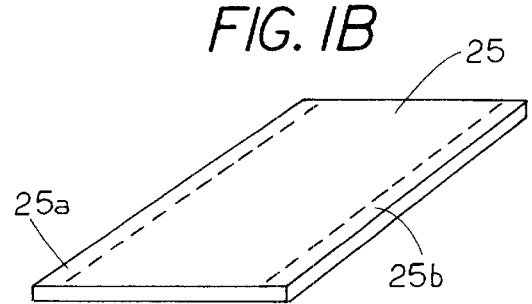
FIG. 1B is a perspective view of a sheet of elastomeric material that can be mechanically deformed into the elastomeric shock isolator of FIG. 1.

While FIG. 1 and FIG. 1A show a molded elastomeric shock isolator, that is a cell in which the shape of the cell in the relaxed state appears as shown in FIG. 1. FIG. 1B is a perspective view of a non-molded or flat sheet of elastomeric material that can be mechanically deformed into an elastomeric shock isolator. To illustrate elastomeric shock isolator 10 in a molded or unmolded condition reference should be made to FIGS. 2 to 4.

FIG. 2 is an end view of an elastomeric shock isolator 10 supported by a top rigid mounting plate 31 that is secured to base 11 and a lower rigid mounting plate 32 that is secured to foot 14 and to foot 15 to provide a shock mount with tension support. In the embodiment shown in FIG. 2 the elastomeric shock isolator 10 can be either molded or non-molded. If the elastomeric shock isolator 10 is molded the plates 31 and 32 can be directly secured to the respective base and feet of the elastomeric shock isolator 10. On the other hand if a sheet of elastomeric material 25, as shown in FIG. 1B, is used the edges of the elastomeric sheet can be secured at areas 25a and 25b to a first rigid base plate to form the elastomeric sheet into a bowed shape indicated in FIG. 2. The second base plate 31 can then be secured to the middle portion of the bowed shape which results in an elastomeric shock isolator having substantially the same appearance as the molded elastomeric shock isolator shown in FIG. 2.

Figure 3:
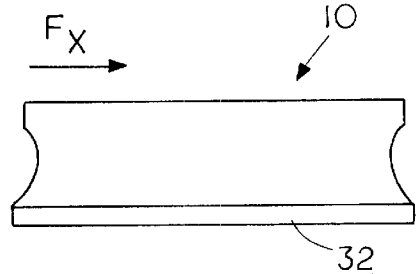
FIG. 3 is a side view of the elastomeric shock isolator of FIG. 2.

FIG. 3 is a side view of the elastomeric shock isolator 10 of FIG. 2 and FIG. 4 is an end view of the elastomeric shock isolator of FIG. 2 wherein therein the elastomeric shock isolator 10 has been compressed. A feature of the tension mode mount shown in FIG. 2 is that while the elastomer material lacks sufficient rigidity to withstand buckling forces it does provide a cushion effect in the event of a major collapsing force. That is, the elastomer legs 12 and 13 buckle in response to force F. With the base and foot mounting of rigid plates in the tension mode as shown in FIG. 2 it is not intended to provide compression resistance, however, the shock isolator 10 shown in FIG. 4 does provides a bottom cushioning effect. That is, if the base plate 31 is forced toward base plate 32 the article attached to base plate 31 would engage the resilient protrusions 10a and 10b before the base plate 10 reached the contact position thereby providing a cushioning effect.

FIG. 2 shows force arrows $F_1$ and $F_2$ positioned above base 11 of elastomer shock isolator 10. In contrast to the compressive force F illustrated in FIG. 4 the direction of forces $F_1$ and $F_2$ cause the elastomer member to be maintained in tension as the forces $F_1$ and $F_2$ are balanced by the internal tension forces within the elastomer member.

FIG. 5 is a front view of a housing 35 with a set of shock mounts or shock isolators 37, 38, 39 and 40 supporting an inner cabinet 36 in a shock isolated condition. Shock isolators 37 and 39 are located in a paired condition as are shock isolators 38 and 40. That is, one end of shock isolator 37 is secured to housing 35 and the other end is secured to one side of cabinet 36 while shock isolator 39 has one end secured to housing 35 and the other end secured to the other side of cabinet 36 so that both shock isolators 37 and 39 coact to hold the cabinet in a central position in housing 35. Similarly, shock isolators 38 and 40 are located in a paired condition with one end of shock isolator 38 secured to housing 35 and the other end secured to one side of cabinet 36 while shock isolator 40 has one end secured to housing 35 and the other end secured to the other side of cabinet 36 so that both shock isolators 38 and 40 also coact to hold the cabinet in a central position in housing 35. In the embodiment shown the shock isolators are all mounted in the tension mode. That is the shock isolators as shown in FIG. 2 are mounted such that support plate 11 would be mounted to cabinet 11 and support plated 32 would be mounted to housing 35 or vice versa.

To illustrate shock forces to a paired support, force arrows $F_3$ and $F_4$ are positioned proximate the outer housing. In operation of the system the shock forces impacting on housing 35 would be isolated from cabinet 36 by the coaction of the opposite pairs of shock isolators 37 and 39 as well as the opposite pairs of shock isolators 38 and 40 if the shock isolators are mounted in the tension mode. That is, although neither of shock isolators 37 or 39 provide compression resistant (see FIG. 4) one of the shock isolator 37 or 39 will always be in a tension resistance mode in response to force $F_3$ whether the force $F_3$ is positive or negative. Consequently, with a paired arrangement as shown in FIG. 5 a pair of shock isolation cell each providing elongation resistance can be mounted in a paired position to provide for shock isolation by the coaction of the two oppositely disposed shock isolators.

FIG. 5a shows a top view of the cabinet 36 of FIG. 5 with the end view of the modular shock isolators 37 and 39 visible. The shock isolators are positioned with the elongated based oriented in a vertical direction which places each of the legs of the modular shock isolators into a tension or shear mode. In some instances it may be desirable to have shock isolators that provide both compression resistance and elongation resistance. For these conditions the elastomeric shock isolator is supported on end faces 16 and 17 rather lateral faces provided by base 11 and feet 14 and 15. The end face mount and bias mount allows the user the option of providing both tension and compression resistance and is suitable in those situations where only one shock isolator can be used.

FIG. 5B shows a side view of a different component 70 of a system supported by a set of three identical; modular shock isolators 62, 63 and 64 that are tiled together in an end-to-end fashion to create a shock mount having the proper shock and vibration damping characteristics. That is, instead of manufacturing a single shock isolator to support cabinet 70 on wall 61 one can in situ assemble three modular shock isolators of identical shock and damping characteristics in an end-to-end fashion to create a shock mount having the desired shock and isolation characteristics to protect component 70.

FIG. 6 is a perspective view of a sheet of damping material 40 having high damping characteristics to damp the natural spring-back of elastomer material used in shock mounts.

As the damping material has a general fluid nature that makes it difficult to use separately, the damping material is sewed or stitched at various locations as indicated by reference numeral 40a.

FIG. 7 shows a perspective view of the layered materials for forming a modular shock isolator with the layered materials including a first sheet of elastomer material 41 and a second sheet of elastomer material 42 with a layer of damping material 40 sandwiched between the first sheet of elastomer material and the second sheet of elastomer material.

FIG. 8 is an end view of a modular shock isolator with a layer of damping material 40 sandwiched between the first sheet of elastomer material 44 and the second sheet of elastomer material 42. In order to provide support for the modular shock isolator a first rigid member 46 is secured to foot 50 and a second rigid member 45 is secured to foot 51 with a third rigid member 47 secured to base 52.

FIG. 9 is a perspective view of a modular shock isolator 60 assembled from a set of rigid elongated members 46, 56, 47, 45 and 55 and a plurality of elastomer sheets of material 42 and 41 which have been sandwiched around a layer of damping material 40 having a damping characteristic different from a damping characteristic of either elastomer sheet of material 42 and 41. The modular shock isolator 60 can be used individually as shown in FIG. 5 or in a ganged relationship as shown in FIG. 5B.

Thus the present invention comprises method of system shock isolation by forming a first modular shock isolator having a first set of shock and vibration characteristics, a second modular shock isolator having a second set of shock and vibration characteristics substantially the same as the shock and vibration characteristics of the first set of shock and vibration characteristics. One can determine the required shock and vibration characteristics of a plurality of components of a system to be protected from shock and vibration. Once determined the user can determine a set of different shock and vibration characteristics obtainable with use of the first and second modular shock isolators and then through an in situ cooperative arrangement of the first and second modular shock isolators the user can isolate each of the plurality of components of the system from shock and vibration using multiple modular isolators.

We claim:

1. A method of making a modular shock isolator comprising:

forming a first sheet of elastomer material;

spacedly securing a layer of damping material having a damping characteristic different from a damping characteristic of the first sheet of elastomer material to the first sheet of elastomer material with stitching;

forming the first sheet of elastomer material into a base with laterally outward extending legs and laterally outward extending feet;

securing the base to a rigid first member; and securing the feet to a second rigid member to form a modular shock isolator having a first set of shock and damping characteristics.

2. The method of claim 1 wherein a plurality of modular shock isolators are incorporated into a single shock mount.

3. The method of claim 1 wherein at least two modular shock isolators are ganged together to create a shock mount having a second set of shock and damping characteristics different from said first set of shock and damping characteristics.

4. The method of claim 1 comprising an in situ formation of at least two modular shock isolators neither having the proper shock and vibration characteristics for supporting a component in a system into a shock mount having the proper shock and vibration characteristics for supporting the component in the system.

5. A method of making a modular shock isolator comprising:

forming a first sheet of elastomer material;

selectively securing a layer of damping material to the first sheet of elastomer material with an adhesive;

forming the first sheet of elastomer material into a base with laterally outward extending legs and laterally outward extending feet;

securing the base to a rigid first member; and securing the feet to a second rigid member to form a modular shock isolator having a first set of shock and damping characteristics.

6. A method of making a modular shock isolator comprising:

forming a first sheet of elastomer material;

sandwiching a layer of damping material between the first layer of elastomer material and a second layer of elastomer material;

forming the first sheet of elastomer material into a base with laterally outward extending legs and laterally outward extending feet;

securing the base to a rigid first member; and securing the feet to a second rigid member to form a modular shock isolator having a first set of shock and damping characteristics.

7. The method of system shock isolation comprising:

forming a first modular shock isolator having a first set of shock and vibration characteristics;

forming a second modular shock isolator having a second set of shock and vibration characteristics substantially the same as the first set of shock and vibration characteristics;

determining a required shock and vibration characteristic of a plurality of components of a system to be protected from shock and vibration; and determining a set of different shock and vibration characteristics obtainable with use of the first and second modular shock isolators and then using a cooperative arrangement of the first and second modular shock isolators to isolate each of the plurality of components of the system from shock and vibration.

8. The method of claim 7 including the step of forming each of the modular shock isolators with sheets of an elastomer.

9. The method of claim 8 including the step of sandwichingly securing the sheets of each of the elastomer to a high damping material.

10. The method of claim 7 including the step of forming the first and second modular shock isolators in an end-to-end relationship to create a shock mount of different shock and vibration characteristics then each of the individual modular shock isolators.

11. The method of claim 7 comprising the step of mounting each of the shock isolators in a tension mode.

12. A modular shock isolator comprising:

a first member;

a second member a first sheet of elastomer material, said first sheet elastomer material having a base with a first leg extending from a first side of said base and a second leg extending from the second side of said base, said base secured to said first member, each of said legs having a laterally outward extending foot with each of said feet extending in opposite directions with each of said feet secured to said second member;

a second sheet of elastomer material, said second sheet elastomer material having a base with a first leg extending from a first side of said base and a second leg extending from the second side of said base, said base secured to said first member, each of said legs of said second sheet having a laterally outward extending foot with each of said feet of said second sheet extending in opposite directions with each of said feet of said second sheet secured to said second member; and a third sheet of material having a damping characteristic different from a damping characteristic of said first sheet of elastomer material and said second sheet of elastomer material, said third sheet of material sandwiched between said first sheet of elastomer material and said second sheet of elastomer material.

13. The modular shock isolator of claim 12 wherein the third sheet of material is stitched to said first sheet of material.

14. The modular shock isolator of claim 12 wherein the third sheet of material is adhesively secured to said first sheet of material.

15. The modular shock isolator of claim 12 wherein the first member is a rigid member and the second member is a rigid member.

16. The modular shock isolator of claim 12 wherein the first member is an elongated rigid member and the second member is an elongated rigid member.

17. The modular shock isolator of claim 12 including:

a housing;

a cabinet for mounting within said housing;

a first end of the modular shock isolator secured to said housing and a second end secured to said cabinet; and a second elastomeric shock isolator having a first end secured to said housing and a second end secured to said cabinet with said second elastomer shock isolator positionally paired so that a shock to the housing results in either one or both of the elastomeric shock isolators providing tensional resistance to maintain the cabinet in a shock isolated condition.

* * * * *